United States Patent [19]

Veaux et al.

[11] Patent Number: 4,556,179
[45] Date of Patent: Dec. 3, 1985

[54] AIRCRAFT LANDING GEAR

[75] Inventors: Jacques Veaux, Chatillon; Michel Derrien, Versailles, both of France

[73] Assignee: Messier-Hispano-Bugatti (S.A.), Montrouge, France

[21] Appl. No.: 559,539

[22] Filed: Dec. 8, 1983

[30] Foreign Application Priority Data

Dec. 30, 1982 [FR] France ............................ 82 22094

[51] Int. Cl.⁴ .......................................... B64C 25/10
[52] U.S. Cl. ........................... 244/102 R; 244/102 A; 244/102 SL
[58] Field of Search ........ 244/102 R, 102 A, 102 SL, 244/102 SS, 100 R

[56] References Cited

U.S. PATENT DOCUMENTS

| | | | |
|---|---|---|---|
| 2,371,699 | 3/1945 | Martin | 244/102 R |
| 4,422,602 | 12/1983 | Turiot | 244/102 R |
| 4,422,603 | 12/1983 | Turiot et al. | 244/102 R |

FOREIGN PATENT DOCUMENTS

988595  8/1951  France ............................ 244/102 R

Primary Examiner—Rodney Corl
Assistant Examiner—D. Williams
Attorney, Agent, or Firm—Sughrue, Mion, Zinn, Macpeak & Seas

[57] ABSTRACT

The present invention relates to landing gear. The landing gear has a strut (2) having one end pivotally mounted about a first axis (4) suitable for connection to the structure (1) of an aircraft. A lower portion (6) for supporting running gear (10) is pivotally mounted relative to said strut (2) to pivot about a second axis. A collapsible side brace (20) has one end suitable for connection to a first point (27) of the aircraft structure (1) for pivoting about a third axis (29) and a fourth axis (30) providing rotation with two degrees of freedom about said third and fourth axes respectively. The third axis (29) passes through said first point (27) being situated on a line which is not colinear with the first axis but which intersects said first axis at a second point (40). A pivot pin (33) is rotatable about a fifth axis (35), the fifth axis not being colinear with said first (4), third (29) and fourth (30) axes and being situated on a line which passes through said second point (40). Pivot pin (33) is connected firstly via a sixth axis of rotation (32) to the other end (31) of said collapsible side brace (20), and secondly via a crank system (43, 46, 50) to said lower portion (6). There is controlled rotation of said strut (2) about said first axis (4).

8 Claims, 7 Drawing Figures

AIRCRAFT LANDING GEAR

The present invention relates to aircraft landing gear and more particularly to main landing gear retractable into the structure of a plane.

BACKGROUND OF THE INVENTION

Generally speaking, retractable landing gear should occupy minimum space when retraced into the fuselage, and naturally it should be as light as possible. Some kinds of aircraft, such as combat or fighter planes, require a structure or fuselage which is as streamlined as possible to reduce resistance to forward movement. Retractable undercarriages or landing gear have always been used to improve penetration through the air. Retractable landing gear is landing gear capable of taking two positions:

a first or "extended" position enabling the aircraft to land or take off; and a second or "retracted" position for use in flight, in which the gear is retracted into housings provided for the purpose in the fuselage.

Consequently, when landing gear is provided for such aircraft, it must be designed in such a manner that, once retracted, it occupies the minimum possible space in order: firstly to be fully received in said housings; and secondly to leave sufficient space for all the other components that need to be housed in the fuselage, such as controls, electronics, an engine, and fuel tanks.

An essential characteristic of landing gear for such an aircraft is that when it is fully retracted, all its parts must be accurately folded and occupy minimum space, and further the wheel may take up a position relative to the leg which is not necessarily the same as the position which it occupies when the landing gear is in the extended position.

To obtain such results, various types of aircraft landing gear have been made mainly comprising: a strut having one end connected to the aircraft structure; a shock absorber cooperating with the other end of the strut; said shock absorber having running gear, such as pneumatic tyres mounted on hubs, at its end furthest from the strut; and a control actuator having one end connected to the structure and its other end connected to the strut, for example, in such a manner that depending on the two possible positions of the actuator, the strut is either in a landing gear extended position or else in a landing gear retracted position.

Such landing gear generally also includes a "collapsible" side brace having one end connected to the aircraft structure and having its other cooperating either with the strut or with the shock absorber. The collapsible side brace generally comprises two relatively rotatable levers and one of the levers drives a complicated crank system to pivot the wheel to enable it to take up two defined positions relative to the strut depending on whether the strut is in the landing gear extended position or in the landing gear retracted position.

The known landing gear outlined above gives good results, but it is undoubtedly complicated since it is made up of numerous components, and this means that it does not satisfy another characteristic expected of landing gear, namely lightness, or at least as low a weight as possible.

Preferred embodiments of te present invention mitigate these drawbacks and provide an aircraft landing gear in which the leg that carries the running gear is pivotable about the strut axis as the landing gear moves between an extended position and a retracted position inside the structure, and in which the landing gear requires few components, thus enabling it to be relatively light and also less expensive than prior art landing gear.

SUMMARY OF THE INVENTION

More precisely, the present invention provides aircraft landing gear of the type which is retractable between an extending position and a retracted position, wherein the landing gear comprises: a strut having one end pivotally mounted about a first axis suitable for connection to the structure of an aircraft; a lower portion for supporting running gear and pivotally mounted relative to said strut to pivot about a second axis; a collapsible side brace having one end suitable for connection to a first point of the aircraft structure by connection means including a third axis and a fourth axis providing rotation with two degrees of freedom about said third and fourth axes respectively, said third axis passing through said first point being situated on a line which is not colinear with the first axis but which intersects said first axis at a second point; a pivot pin rotatable about a fifth axis, said fifth axis not being colinear with said first, third and fourth axes and being situated on a line which passes through said second point, said pivot pin being connected firstly via a sixth axis of rotation to the other end of said collapsible side brace, and secondly via a crank system to said lower portion; and means for controlling rotation of said strut about said first axis.

BRIEF DESCRIPTION OF THE DRAWINGS

Embodiments of the invention are described by way of example with reference to the accompanying drawings, in which.

MORE DETAILED DESCRIPTION

Figure 1:
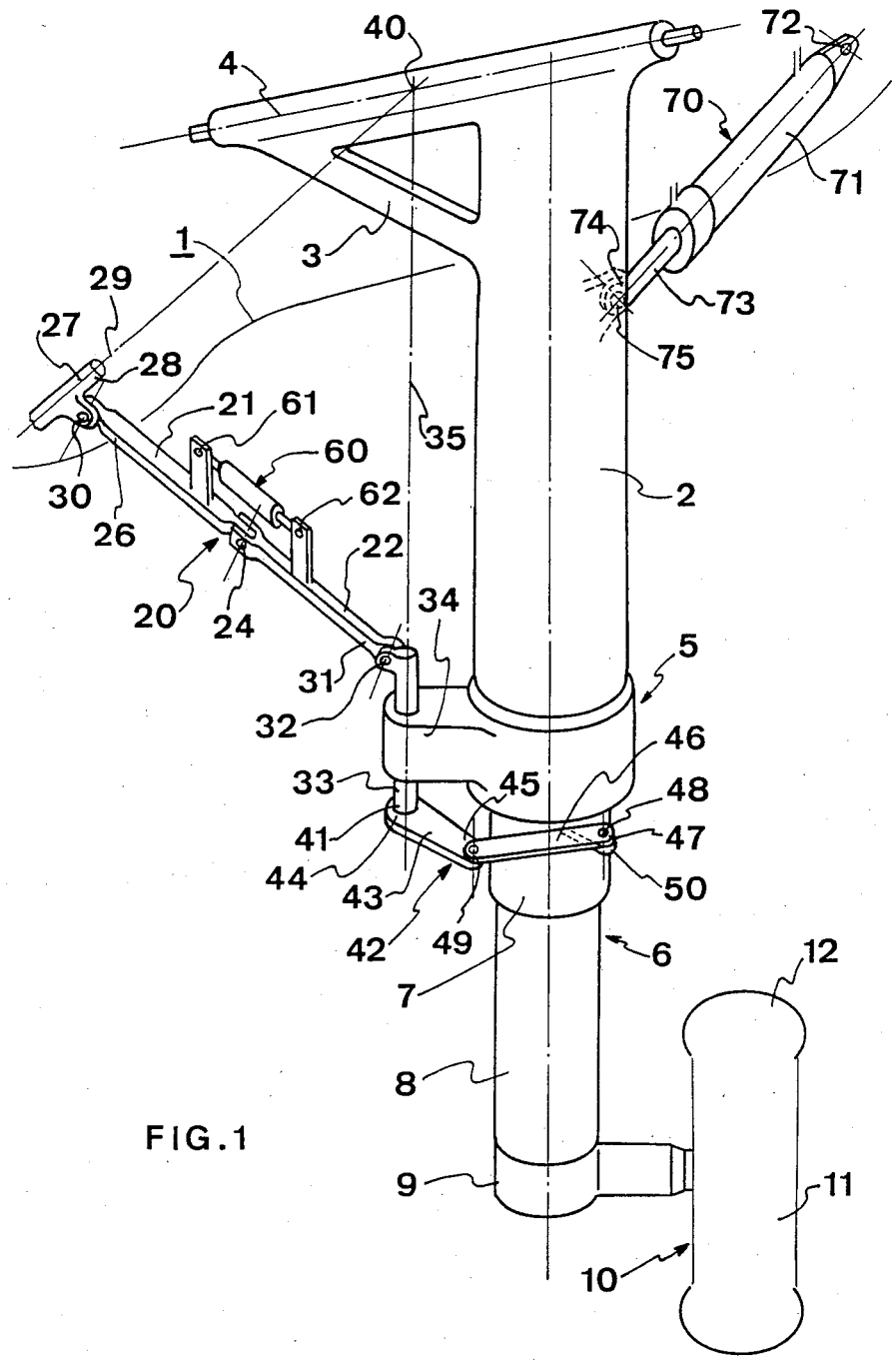
FIG. 1 is a somewhat diagrammatic perspective view of one embodiment of landing gear in accordance with the present invention.

With reference in particular to FIG. 1, this figure is a somewhat diagrammatic perspective view of one embodiment of landing gear enabling the overall structure of the landing gear to be seen clearly, ie: the assembly of means from which it is made up and the manner in which they cooperate.

The structure of the aircraft for which the landing gear is intended is outlined at 1.

More precisely, the landing gear comprises a strut 2 having one end 3 which is reinforced to be pivotally mounted about a shaft 4 which is held in bearings (not shown) fixed to the aircraft structure 1. The other end 5 of the strut 2 has a cavity (not visible) in which a lower portion 6 is pivotally mounted, said lower portion 6 being constituted by a base 7 and a rod 8, with the base 7 and the rod 8 preferably constituting a shock absorber. More precisely, the base 7 is mounted in the cavity in the end 5 of the strut 2 in such a manner that the entire lower portion 6 is rotatable about an axis which is essentially the axis of the strut 2.

The furthest end 9 of the portion 6 from the end 5 of the strut, supports running gear 10, eg. a wheel comprising a hub 11 supporting a tire 12. The landing gear further includes a collapsible side brace 20, ie. a side brace advantageously comprising two levers 21 and 22 which in this embodiment are pivotable relative to each other about an axis 24. The end 26 of the lever 21 is connected to a portion 27 of the aircraft structure 1 by means of a universal joint 28 defining two axes 29 and 30 which are generally mutually perpendicular, with the axis 29 enabling the joint to pivot relative to the aircraft structure and the axis 30 enabling the lever 21 to pivot relative to the joint 28.

The other end of the side brace, ie. the end 31 of the lever 22, is pivotally mounted about an axis 32 having one degree of freedom on a pivot pin 33. The pivot pin 33 is mounted on a projecting portion 34 integral with the end 5 of the strut in such a manner that the pivot pin 33 may be pivoted about its own axis 35.

The landing gear structure is designed in such a manner that the axis 29 passing through the point 27 of the structure 1 is not colinear with the axis 4, but rather intersects said axis at a point 40. Likewise, the pivot pin cooperates with the projecting portion 34 in such a manner that its axis of rotation 35 is not colinear with either of the axes 29 and 4, but rather intersects both of them at their point of intersection 40.

The pivot pin is connected by its end 41 to the lower portion 6, and more particularly to the base 7 by means of a crank system 42 comprising a first crank web 43 having one end 44 fixed to the portion 41 of the pivot pin 33 and having its other end 45 pivoted to a connecting rod 46 about an axis 49 with the other end 47 of the connecting rod 46 being pivotally mounted about an axis 48 which is fixed relative to a portion 50 (eg. a projecting portion 50) of the base 7.

Advantageously, the axes 48 and 49 are parallel to the axis 35 of the pivot pin 33.

The collapsible side brace 20 includes auxiliary control actuator or means 60 for controlling its collapse, eg. an auxiliary actuator comprising a cylinder and a rod and having its ends connected to respective portions 61 and 62 which are connected to the levers 21 and 22 respectively.

The landing gear shown in FIG. 1 can thus take up two positions as described in the introduction, ie. an extended position as shown in the FIG. 1 and a retracted postion.

To cause the landing gear to move between said two positions, it includes means for controlling rotation of the strut 2 about the axis 4. These means may be constituted by a main actuator 70 having a cylinder 71 pivotally fixed at its end 72 to a fixed point on the aircraft structure 1.

The rod 73 of said actuator 70 has its end 74 pivotally mounted to a point 75 on the strut 2 at a distance from the strut rotation axis 4. Thus by controlling the application of fluid to the actuator 70 in known manner, the rod 73 may be extended from the cylinder 71 to cause the strut 2 to pivot about the axis 4 to cause the landing gear to enter housings provided therefor in the aircraft structure 1. Naturally, the reverse movement is obtained by returning the rod 73 into the cylinder 71 by a corresponding application of fluid to the actuator in the opposite direction to before, thereby extending the landing gear.

Figure 2:
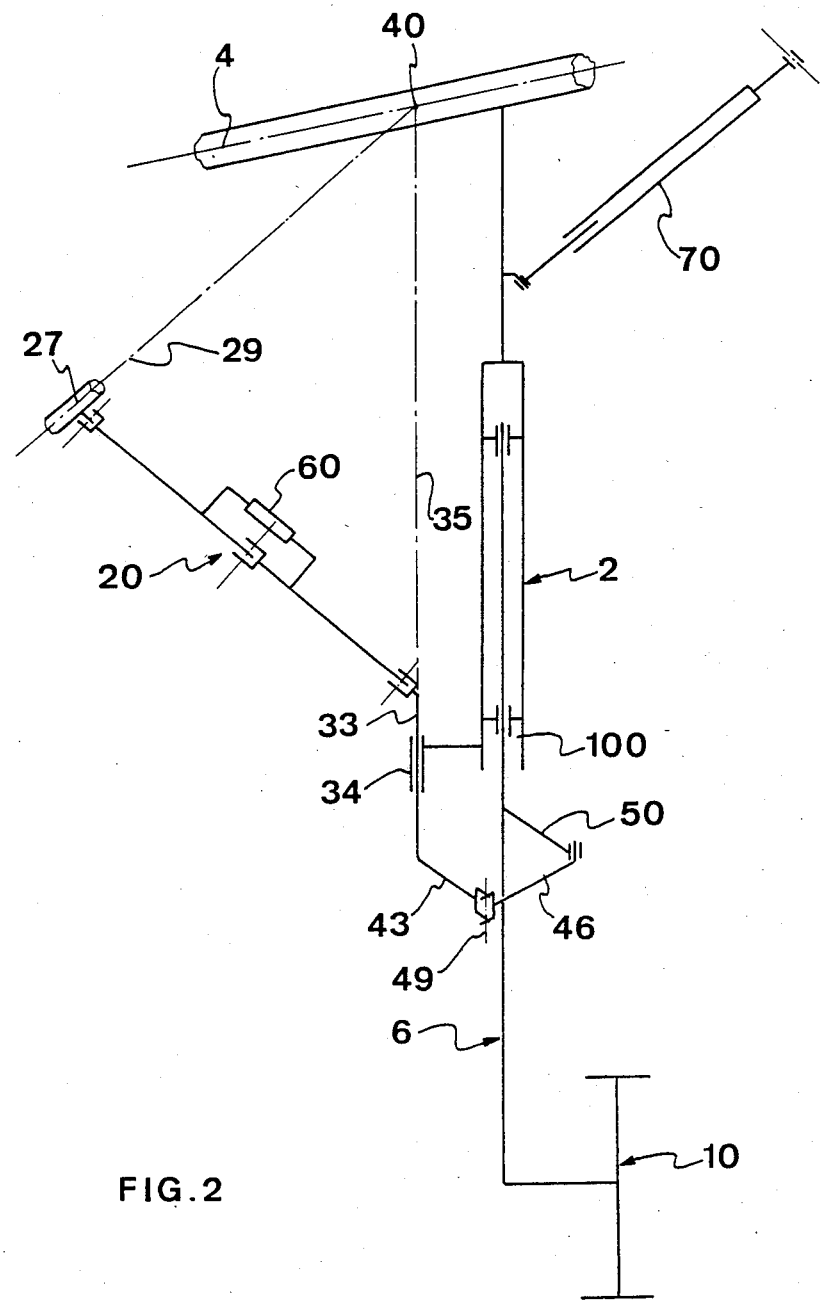
FIGS. 2 and 3 are diagrams showing the FIG. 1 landing gear respectively in the extended position and in an intermediate position part of the way between the FIG. 2 extended position and the retracted position (which retracted position has not been shown for convenience in drawing, and since it presents no difficulty in understanding)
Figure 3:
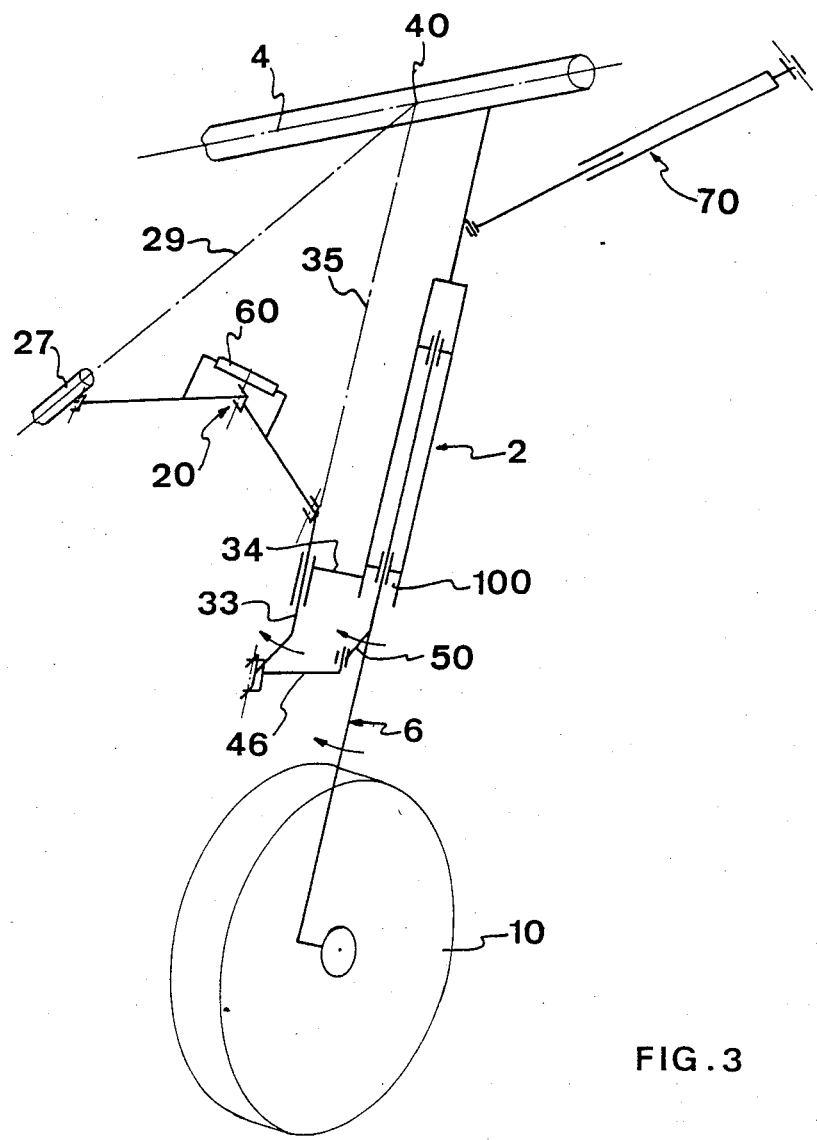

The landing gear as described above with reference to FIG. 1, operates as follows:

Operation is described more particularly with reference to FIGS. 2 and 3 in which the main components of the FIG. 1 landing gear are shown in diagrammatic form in order to clarify their interaction and relative motions. Furthermore, reference numerals used in FIGS. 2 and 3 and which can also be found in FIG. 1 naturally designate the same components of the landing gear. FIG. 2 shows the landing gear in the extended position and the side brace 20 can be seen to be quite straight and the lower portion 6 which is pivotable inside a sleeve 100 as mentioned above can be seen to be in a well-defined position relative to the strut 2.

In order to move the landing gear to its retracted position, starting with the landing gear in the extended position, the side brace 20 is caused to collapse by powering the auxiliary control actuator 60, for example. Then, and practically simultaneously, power is applied to the main actuator 70 to cause the strut 2 to pivot about the axis 4. Taking the plane of FIG. 2 to be the reference plane of the extended landing gear, the strut 2 is thus rotated forwardly. Since the point 27 at one end of the side brace is fixed relative to the aircraft structure, and thus relative to the axis 4, rotating the strut 2 causes the pivot pin 33 to pivot about its axis 35. This is equivalent to rotation of the plane defined by the axes 29 and 35 which intersect at the point 40. Rotating the pivot pin 33 about its axis 35 causes the crank 43, the connecting rod 46 and the equivalent crank 50 to apply the same rotation to the lower portion 6 about the axis of the strut 2. Since the pivot pin is held in a journal 34 which is fixed to the strut 2, the lower portion 6 is subjected to a rotation relative to the strut 2 which is equivalent to the rotation of the pivot pin 33 relative to the strut 2. The further the strut 2 pivots about its axis 4 under the action of the actuator 70, the further the pivot pin 33 pivots relative to its journal 34, thus turning the wheel 10 in conjunction with the lower portion 6 relative to the strut as shown in FIG. 3. The wheel thus enters its housing at an oblique angle to the axis of the aircraft, supposing the aircraft axis to be perpendicular to the plane of FIG. 2. The amplitudes of these movements need to be determined as a function of different parameters applicable to the construction of a given aircraft, but the person skilled in the art and informed about the invention as described above will have no difficulty in determining these amplitudes.

Figure 4:
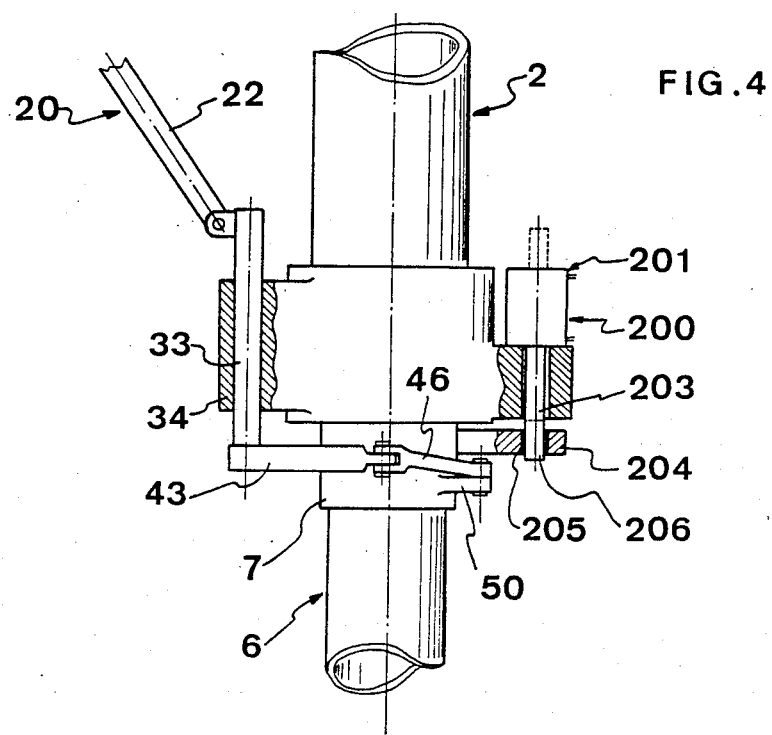
FIG. 4 shows a portion of the FIG. 1 landing gear and highlights an improvement concerning means for locking the leg relative to the strut.

As mentioned, the lower portion 6 can thus pivot about an axis which is generally the axis of the strut 2. It is thus necessary, when the aircraft is running along the ground during take off or landing for the plane of the wheel 10 to be firmly defined, so that the wheel does not vibrate or wobble about an axis parallel to the strut axis which could lead to very rapid tyre wear and blow out. To avoid this drawback, landing gear such as the gear shown in FIG. 1 includes locking means for fixing the lower portion 6 in a well-defined position relative to the strut 2, particularly when the landing gear is in the extended position. FIG. 4 shows one such locking means for landing gear as shown in FIG. 1.

Under such conditions, locking means generally designated 200 may be provided to cooperate between the strut 2 and the lower portion 6. The locking means 200 comprise, for example, means for controlling movement of a rod 203. The control means 201 may be constituted by an electro-magnet or by a hydraulic actuator having a rod that acts as the locking rod mentioned above.

The control actuator such as an electromagnet 201 is fixed to the strut 2, and further the leg 6 includes a lug 204 fixed to the cylinder 7 of the shock absorber, for example, and having an opening or orifice 205 which comes opposite to the end 206 of the rod 203 when the landing gear is in the extended position.

Thus, to lock the portion 6 against rotation relative to the strut 2 when the landing gear is in the extended position, the means 200 are controlled to cause the rod 203 to engage the orifice 205 in the lug 204 and to take up the position shown in FIG. 4, where the unlocked position of the rod is shown in dashed lines.

Figure 5:
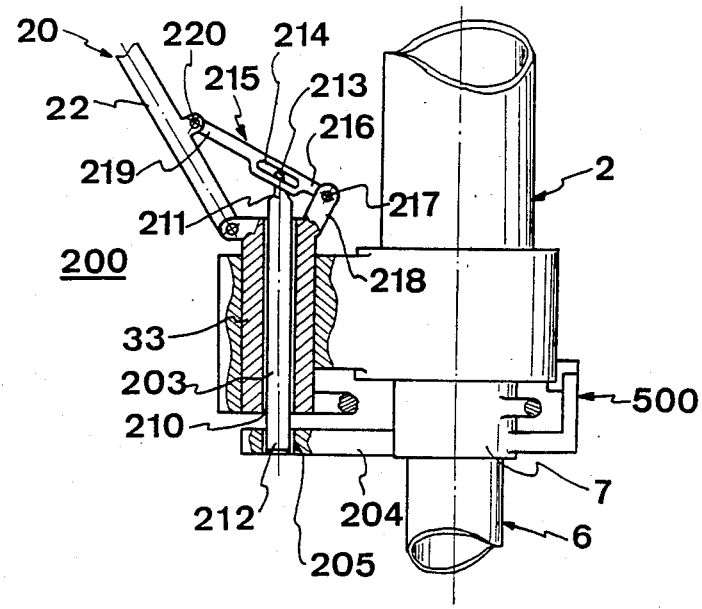
FIGS. 5 and 6 show two other embodiments of means for locking the leg relative to the strut, said means being improvements over the FIG. 4 locking means.
Figure 6:
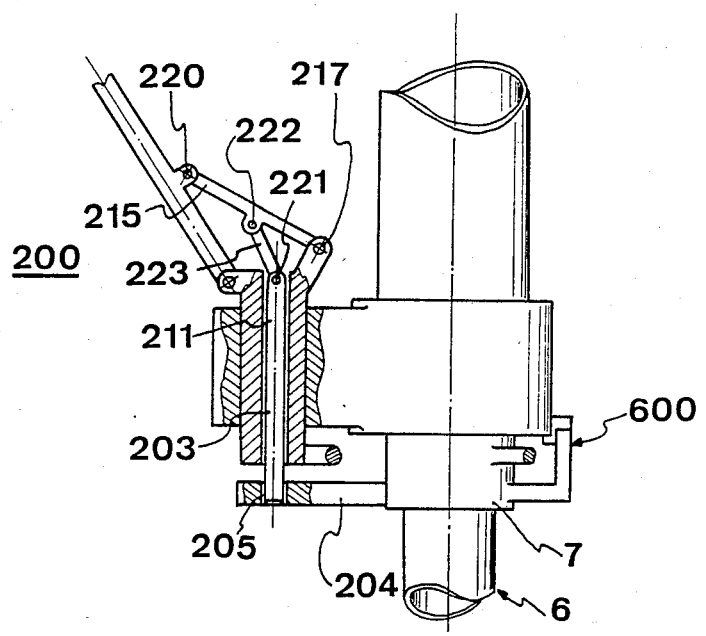

The locking device shown in FIG. 4 gives good results, and ensures that the lower portion 6 is securely locked relative to the strut 2. However, it nevertheless suffers from the disadvantage of requiring a control actuator 201 which may be of non-negligeable weight in some applications, increasing the weight of the landing gear which is always undesireable in such applications, and also requiring independent control means just to make it operate, and further requiring means to synchronize its operation with the other parts of the landing gear. FIGS. 5 and 6 show another embodiment of locking means 200 in which the components used contribute to minimising the total weight of the locking means as a whole, since they do not require independent control means nor synchronization. To achieve this, the drive means for the rod 203 is constituted by the movement of the lever 22 of the side brace 20.

With reference more particularly to FIG. 5, second locking means comprise a lug 204 fixed to the shock absorber cylinder 7 of the lower portion 6 of the landing gear and having an orifice 205 into which the movable rod 203 is received. The rod 203 is slidably mounted in a bore 210 made along the axis of the pivot pin 33 which is used to rotate the lower portion 6 as described above. The rod 203 has one end 212 which engages the orifice 205 in the lug 204 and an opposite end 211 which includes a stud 213 mounted for sliding tanslation in a slot 214 in a link 215. A first end 216 of the link 215 is pivotable about an axis 217 fixed to a lug 218 mounted on the pivot pin 33. The other end 219 of the link 215 is pivoted about an axis 220 which is fixed to the lever 22 of the side brace 20.

The locking device 200 shown in FIG. 5 operates as follows: first it is recalled that when the landing gear is in the retracted position, the lever 22 is folded and at a very small angle relative to the axis 35 of the pivot pin 33, causing the axis 220 between the link 215 and the lever 22 to occupy a position above the axis 217 (where "above" is relative to the configuration shown in FIG. 5). In this position, the link 215 draws the rod 203 upwardly (via the coupling between the slot 214 and the stud 213) so that the rod disengages the orifice 205. In contrast, when the landing gear is in the extended position and the lug 204 moves into a position such that the orifice 205 lies on the path of the rod 203, the lever 22 has rotated downwardly thereby lowering the axis 220 to substantially the same level as the axis 217. In this case, and still with reference to the FIG. 5 configuration, the rod 203 moves downwardly since the stud 213 is pushed down until the end 212 of the rod engages the orifice 205. Naturally, the lower portion 6 must then be in a well-defined position relative to the strut 2. The landing gear thus includes positioning means such as position-determining stops 500 and 600 as shown in FIGS. 5 and 6 respectively.

FIG. 6 shows another embodiment of locking means similar to the means described more particularly with reference to FIG. 5 and in which the end 211 of the rod 203 is coupled to the link 215 by means of a second link 223 which is free to pivot about two axes 221 and 222, one being situated at the end 211 of the rod 203 and the other in the middle of the link 215, in between the axes 217 and 220.

The locking means shown in FIG. 6 operate in exactly the same way as the means shown in FIG. 5, except for the coupling between the link 215 and the rod 203. There is no difficulty in understanding how the rotary motion of the link 215 is transformed into translation motion of the rod 203 regardless of whether it is performed by a stud 213 sliding in a slot 214 or by a second link 223.

However, there may nevertheless be a problem in implementing locking means as shown in FIGS. 5 and 6. When the landing gear reaches or leaves its fully extended position, there needs to be a mechanical time constant so that the rod 203 can either enter or leave the orifice 205 in the lug 204 without being jammed by rotation of the lower portion 6 relative to the strut 2, ie. of the lug 204 relative to the rod 203. In an advantageous embodiment, and more particularly for the embodiments shown in FIGS. 5 and 6, it is necessary for the lever 22 of the side brace 20 to start rotating upwards (relative to the configuration in the figure) before the lower portion 6 begins to rotate about the axis of the strut 2.

In an advantageous construction of the landing gear, the connecting rod 46 has a configuration enabling it to have different lengths between its end axes 48 and 49. Naturally the lengths must lie within a limited range, and resilient means must be provided for damping movement between these limits.

Figure 7:
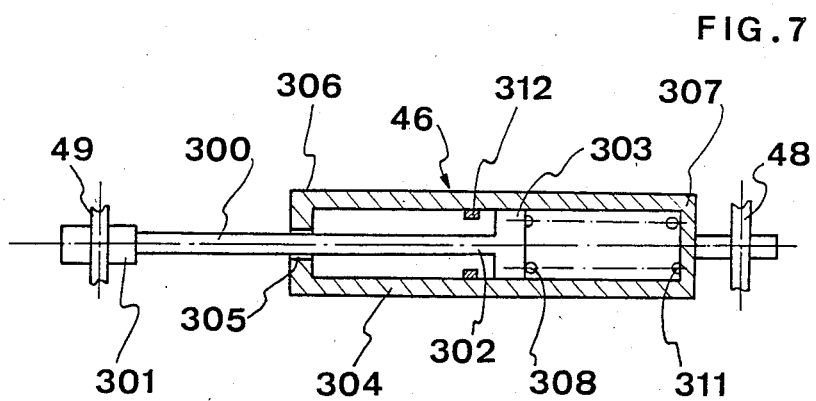
FIG. 7 is a diagrammatic illustration of one of the components used in the locking means of FIGS. 5 and 6.

FIG. 7 shows a possible embodiment of such a connecting rod 46, which is specifically adapted to the embodiments shown in FIGS. 5 and 6. The connecting rod comprises a rod 300 having one end 301 pivoted about the axis 49, while its other end 302 is substantially in the shape of a piston 303 slidable in translation in a cylinder 304. The rod 300 enters the cylinder 304 via an opening 305 made in one end 306 thereof. The other end 307 of the cylinder 304, opposite to the end 306, is pivoted about the axis 48.

To further advantage, a spring 308 is located between the piston 303 and the end 311 of the cylinder 304.

A stop 312 is provided inside the cylinder 304 to limit displacement of the rod 300 inside the cylinder, said stop defining the maximum length of the connecting rod, which occurs when the piston 303 comes into contact with the stop 312.

Consequently, considering the FIG. 7 connecting rod 46 as being installed in the FIG. 5 or 6 embodiments, it can be seen that when the side brace 20 begins to collapse and the lever 22 begins to rotate upwardly, the pivot pin 33 also begins to rotate. It thus pulls on the connecting rod 46 thereby tending to lengthen it since the rod 203 is still received in the orifice 205. The lower portion 6 is thus prevented from starting rotation until the rod 203 is removed from the orifice 205. Only once the lever 22 has pivoted far enough to disengage the rod 203 from the orifice 205, can the crank system 42 which includes the connecting rod 46 begin to rotate the lower portion 6 as described above with reference to FIGS. 1, 2, and 3.

The above description applies to the motion of the various means when the landing gear moves from the extended position towards the retracted position.

In the opposite case, as the landing gear reaches its extended position, the lower portion 6 is rotated by the pivot pin 33 rotating under the action of the lever 22, and it reaches a determined position, eg. because of the stops 500 or 600. The lever 22 can still continue to rotate downwardly without continuing to rotate the lower portion. The extra rotation imposed on the pivot pin to drive the rod 203 into the orifice 205 being absorbed by the rod 300 penetrating into the cylinder 304 against the bias of the spring 306. The extra rotation thus does not move the lower portion 6. It is thus advantageous for the connecting rod shown in FIG. 7 to have an intermediate rest position so that the piston 303 is situated at a distance from the stop 312. This enables the rod to move in either direction between the stop 312 and the end 311.

We claim:

1. An aircraft landing gear of the type which is retractable between a so-called in position and a so-called out position, said landing gear comprising:
   a strut having means for pivotably mounting said strut at one end to the structure of the aircraft;
   said strut including a lower portion provided with a running gear and being pivotably mounted to said strut for rotation about a common axis;
   a collapsible side brace comprising a lever;
   said strut including a projecting end part in proximity to the lower portion of said strut;
   a pivot pin rotatably mounted about its axis on said projecting end part for articulating said lever to said projecting end part;
   a lug fixed to the strut lower portion in juxtaposition to said projecting end part;
   a rod mounted to said projecting end part and being slidable with respect thereto;
   an opening carried by said lug in the path of said rod for receiving the end of said rod to lock said lug relative to said projecting end part and prevent relative rotation therebetween when the landing gear is in its out position; and
   coupling means for coupling said rod to said lever of said collapsible side brace.

2. Aircraft landing gear of the type which is retractable between an extended position and a retracted position relative to an aircraft structure, said landing gear comprising:
   a strut having means at one end for pivotably mounting said strut about a first axis for connection to the structure of the aircraft;
   a lower portion for supporting running gear and pivotably mounted to said strut for pivoting about a second axis;
   a collapsible side brace having means at one end for connection to a first point of the aircraft structure by connection means including means for pivoting said brace about a third axis and a fourth axis providing rotation with two degrees of freedom about said third and fourth axes respectively, said third axis passing through said first point being situated on a line which is not colinear with the first axis but which intersects said first axis at a second point;
   a pivot pin rotatable about a fifth axis, said fifth axis not being colinear with said first, third and fourth axes and being situated on a line which passes through said second point, said pivot pin being connected firstly via means forming a sixth axis of rotation to the other end of said collapsible side brace, and secondly via a crank system to said lower portion;
   means for controlling rotation of said strut about said first axis;
   locking means for locking said lower portion in a determined position relative to said strut, said locking means including a lug fixed to said strut lower portion;
   a projecting end part fixed to the lower end of said strut;
   said pivot pin rotatably mounted to said projecting end part;
   a rod slidably mounted to said projecting end part and projectable within an opening within said lug; and
   means for coupling said rod to said collapsible side brace.

3. Landing gear according to claim 2, wherein said collapsible side brace is constituted by two levers pivotably connected together for relative rotation about a seventh axis.

4. Landing gear according to claim 3, wherein said first connection means are constituted by a universal joint having two axes of rotation.

5. Landing gear according to claim 2, wherein the means coupling said rod with said side brace are constituted by a link having one of its ends pivotably mounted to said pivot pin and its other end pivotably mounted on said lever of said side brace which is connected about said sixth axis to said pivot pin, together with a second connection means between said rod and said link.

6. Landing gear according to claim 5, wherein said second connection means between said rod and said link are constituted by a stud on said rod sliding in a slideway in said link.

7. Landing gear according to claim 5, wherein said second connection means between said rod and said link are constituted by an auxiliary link pivotably mounted at one end on said end of said rod and on the other end to substantially the middle portion of said link.

8. Landing gear according to claim 2, wherein said first connection means are constituted by a universal joint having two axes of rotation.

* * * * *